July 14, 1925.
H. T. DUNBAR
DRAG CLAM
Filed June 13, 1923      6 Sheets-Sheet 1
1,546,214
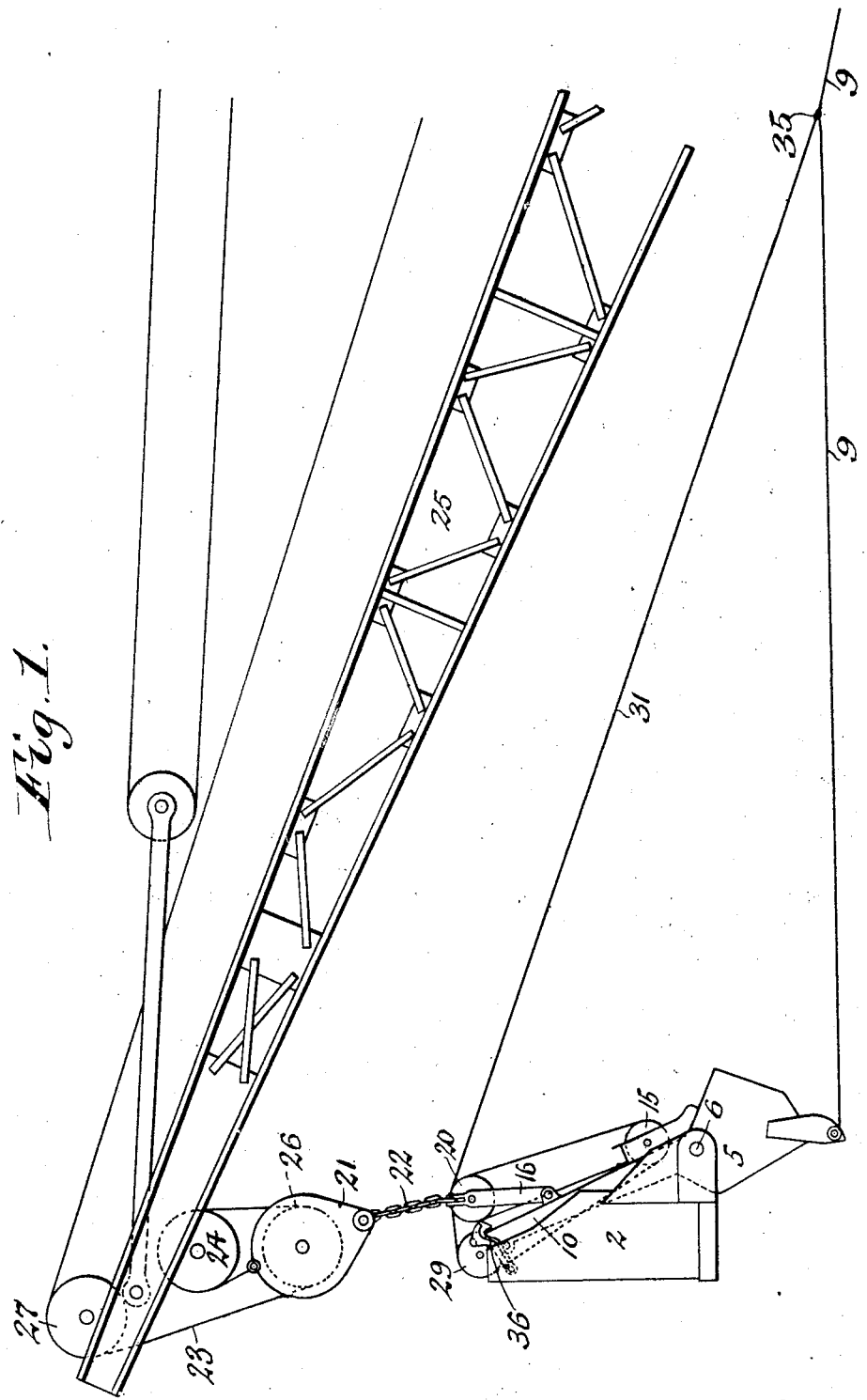

July 14, 1925. 1,546,214
H. T. DUNBAR
DRAG CLAM
Filed June 13, 1923 6 Sheets-Sheet 2
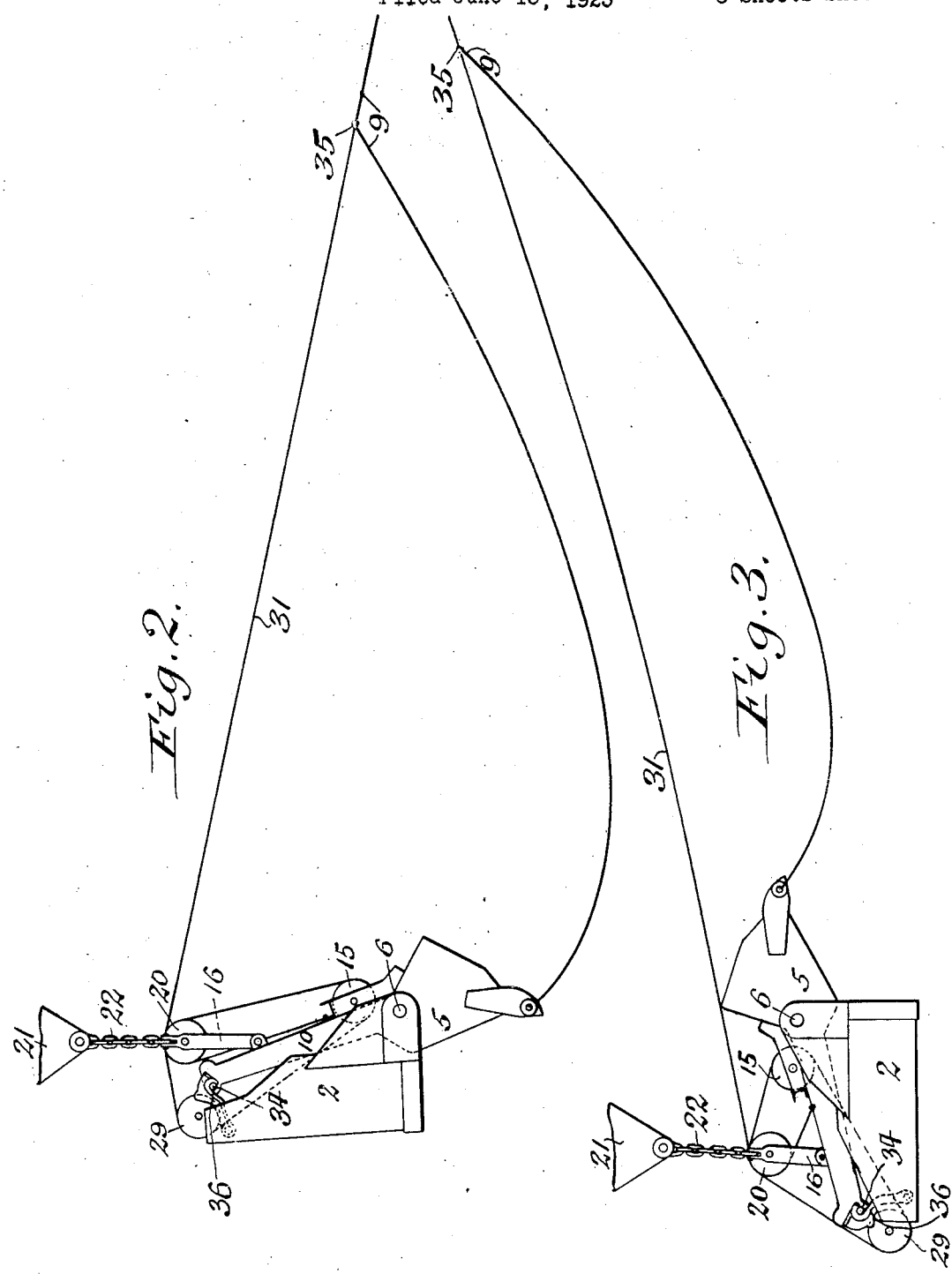

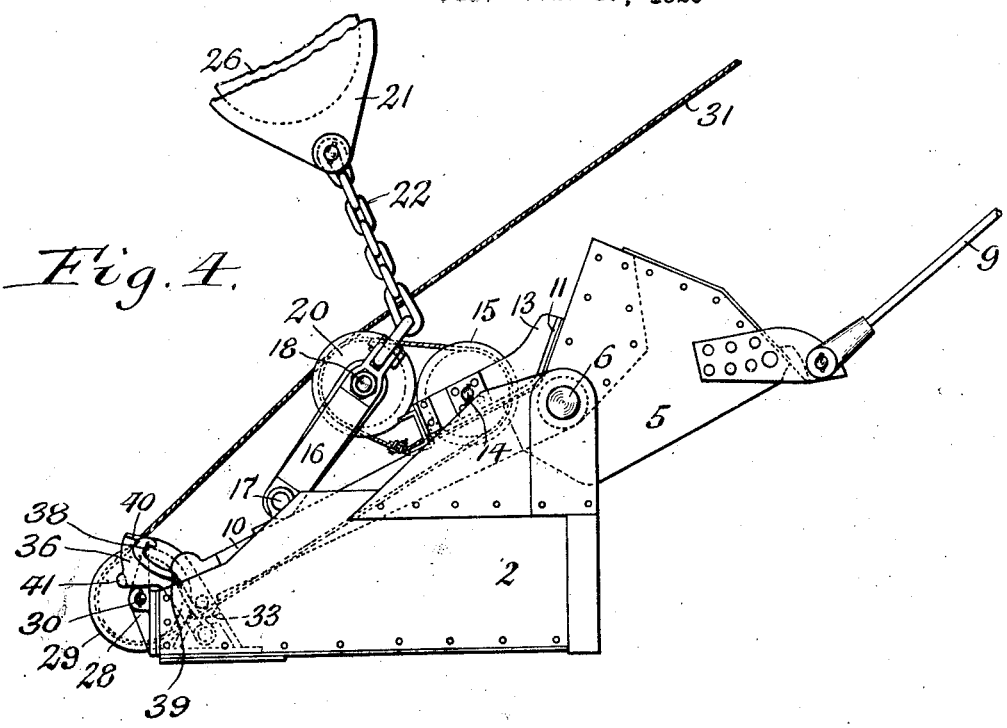
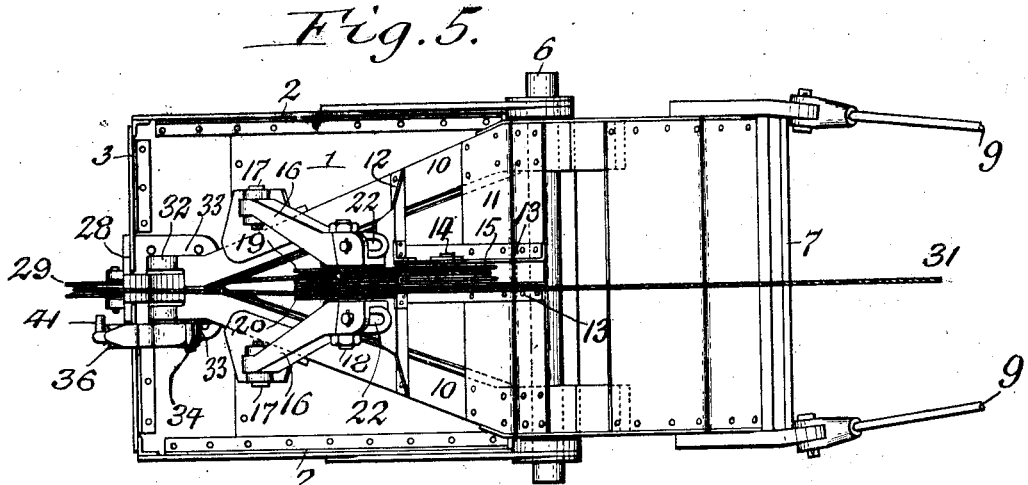
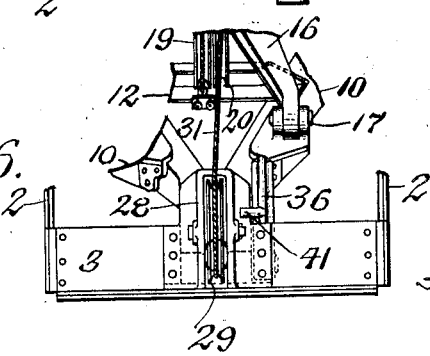

July 14, 1925.

H. T. DUNBAR

DRAG CLAM

Filed June 13, 1923 6 Sheets-Sheet 4

1,546,214

Inventor.
Harris T. Dunbar
By Popp & Powers
Attorneys.

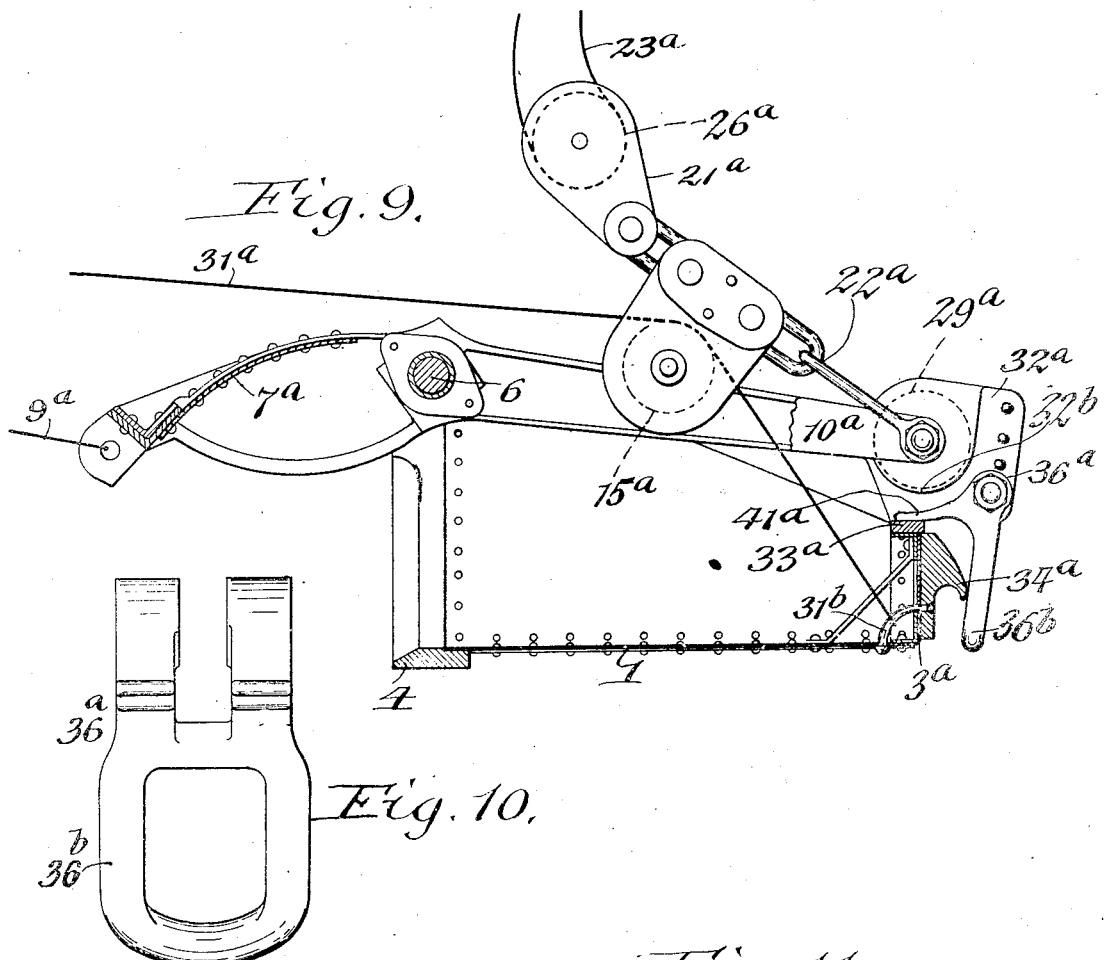
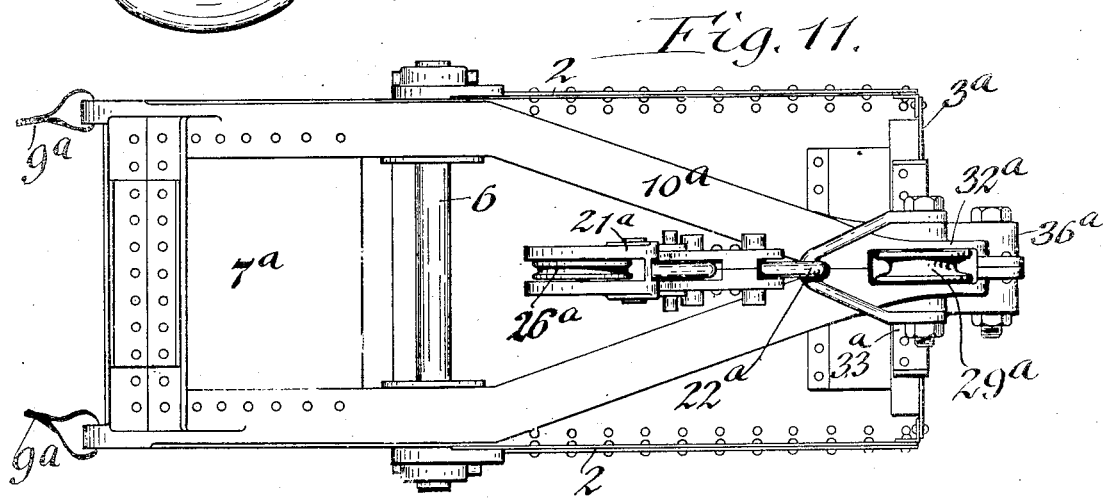

July 14, 1925.　　　　　　　　　　　　　　　　　1,546,214
H. T. DUNBAR
DRAG CLAM
Filed June 13, 1923　　　　6 Sheets-Sheet 6

Harris T. Dunbar Inventor.
by Poff & Powers Attorneys

Patented July 14, 1925.

1,546,214

UNITED STATES PATENT OFFICE.

HARRIS T. DUNBAR, OF BUFFALO, NEW YORK.

DRAG CLAM.

Application filed June 13, 1923. Serial No. 645,208.

*To all whom it may concern:*

Be it known that I, HARRIS T. DUNBAR, a citizen of the United States, residing in Buffalo, in the county of Erie and State of New York, have invented new and useful Improvements in Drag Clams, of which the following is a specification.

This invention relates to a drag-clam which is more particularly designed for picking up or gathering loose material and transferring the same from one place to another, as for instance when excavating or removing soil, gravel or the like in constructing the foundations of railways, the beds of canals and similar work.

In pulling a drag bucket or indeed a drag-clam into material, the first entrance of the material is quite easy. But as the material piles in either bucket its inertia accumulating makes the entrance of additional material increasingly difficult. On the part of the ordinary drag bucket this makes it necessary to pull it a long ways with accompanying abrasion and use of power. If the pull is upward, and only in case of an upward pull, the forward end of the bucket gradually rises and makes the angle of entrance gradually more advantageous. So by pulling the ordinary drag bucket many times its length, many times a full load is obtained.

After a drag-clam has been dumped, if means were not provided to hold it in the open position, it would close by gravity and call for an additional action of opening it again with use of power. This action is not necessary in the hereinafter described drag-clam.

It is the object of this invention to produce a drag-clam which can be loaded by pulling the same a short distance only into the material which is to be carried a full load being obtained by means easily, quickly, cheaply and reliably operated.

Figures 7, 8:
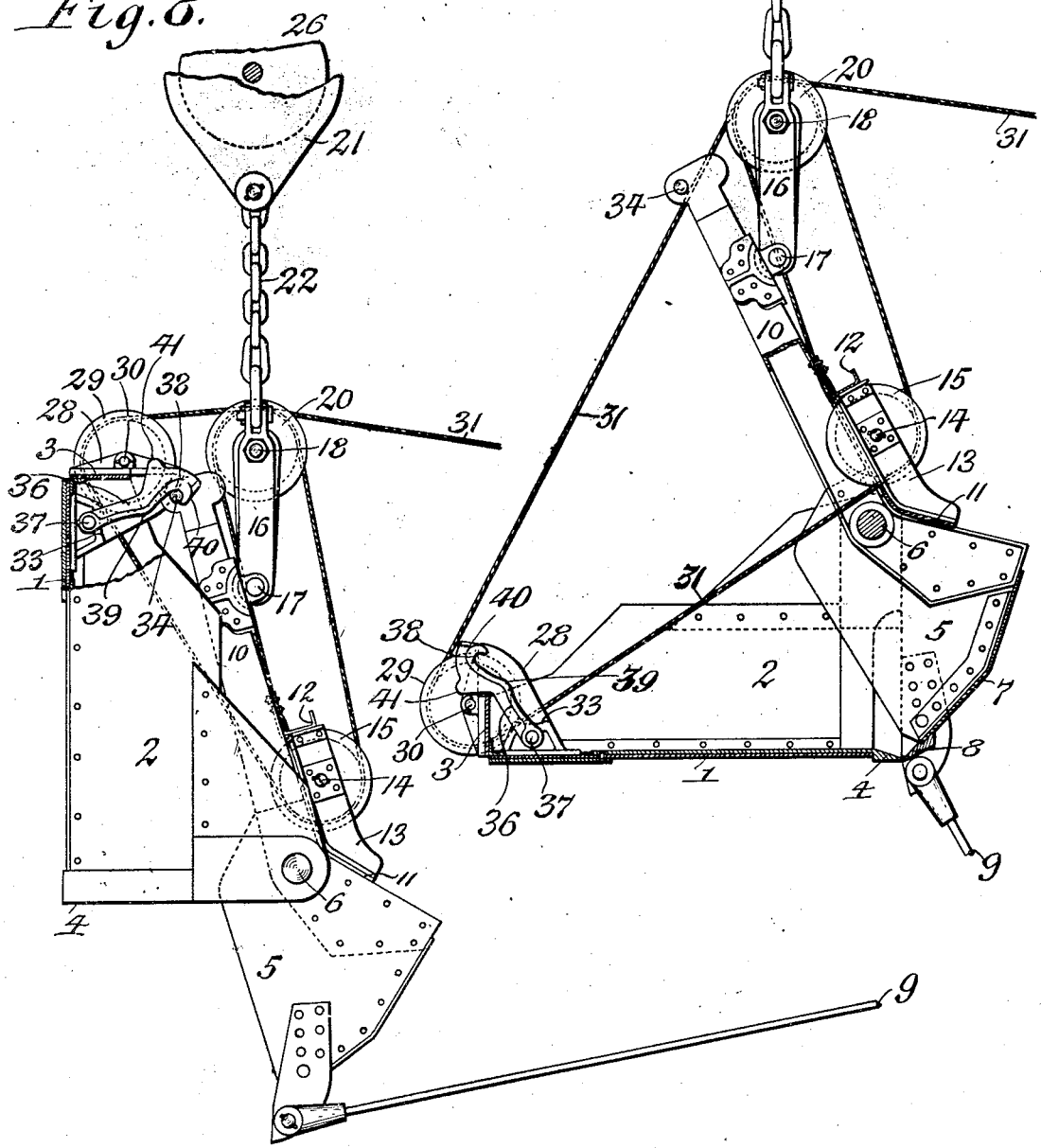
Figure 12:
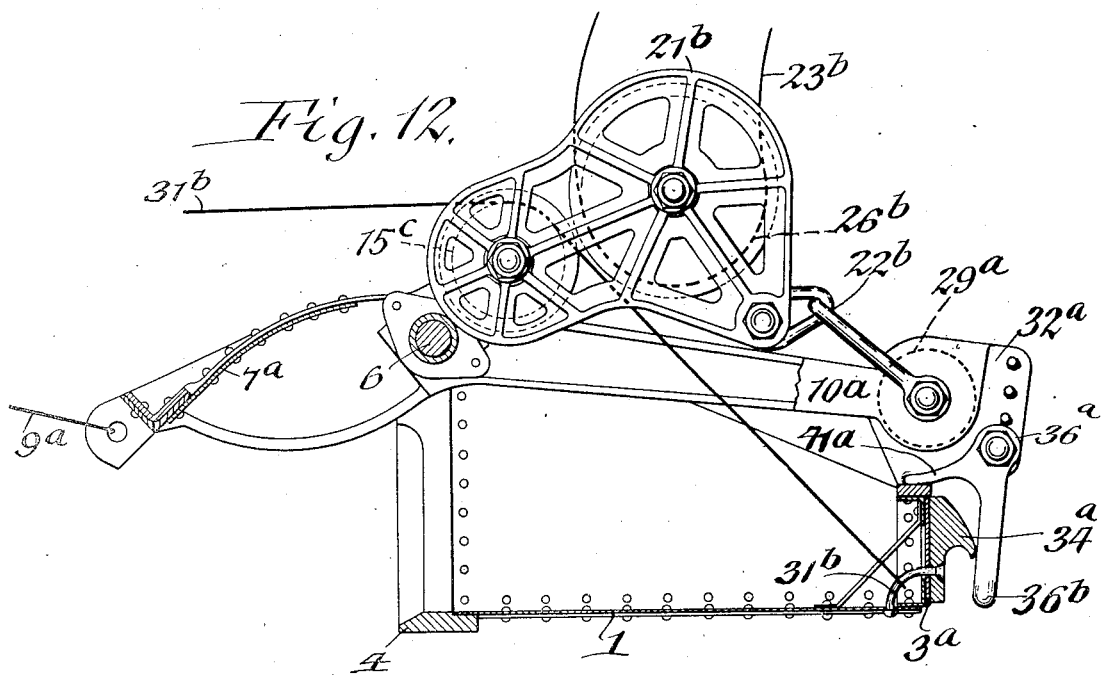
Figure 13:
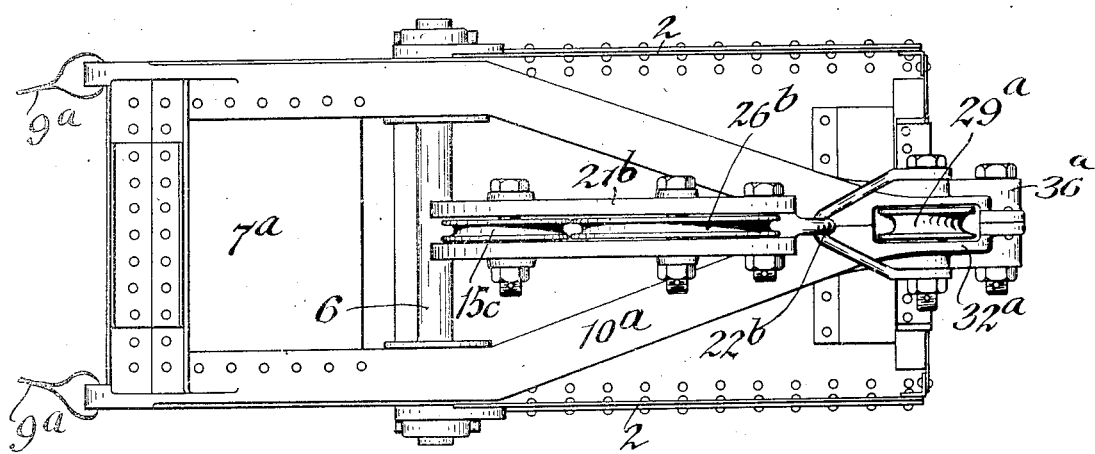

In the accompanying drawings:

Figure 1 is a side elevation of part of a derrick showing my improved drag-clam mounted thereon and occupying the position in which the dumping of the load has been completed. Figure 2 is a side elevation of my improved drag-clam showing the parts in the position which they occupy when relaxing the pull of the dump and drag line after the completion of the dumping operation. Figure 3 is a side elevation of the same showing the position of the parts after the hoisting fall has lowered the drag-clam upon the material or surface which is to be operated upon. Figure 4 is a similar view, on an enlarged scale, showing the position of the parts when the hoisting fall is slack and the drag-clam is being pulled forwardly by the drag line for the purpose of gathering a load of material. Figure 5 is a top plan view of the same. Figure 6 is a fragmentary rear elevation of the drag-clam. Figure 7 is a vertical longitudinal section of the drag-clam showing the position of the parts when the lid of the drag-clam is closed and the drag-clam is being lifted by the hoisting fall. Figure 8 is a side elevation, partly in section, and on an enlarged scale, of the drag-clam showing the position of the parts corresponding to Fig. 2. Figure 9 is a vertical longitudinal section showing a form of my invention slightly different from that shown in Figs. 1–8. Figure 10 is a rear elevation of the latch employed in Fig. 9 for holding the operating arm in the position in which the scoop or bucket is in its open position. Figure 11 is a top plan view of the drag-clam shown in Fig. 9. Figure 12 is a longitudinal sectional elevation showing another modified form of my invention. Figure 13 is a top plan view thereof.

Similar characters of reference indicate corresponding parts throughout the several views.

The body of this drag-clam is constructed in the form of a scoop which comprises a horizontal bottom 1, two longitudinal side walls 2 projecting upwardly from opposite longitudinal edges of the bottom, and a rear transverse wall 3 projecting upwardly from the rear edge of the bottom and connecting the rear ends of the side walls, thereby producing a bucket or box which is open at the top and also has its front end open, so as to form an inlet mouth for the scoop.

In order to strengthen the mouth of this scoop when being hauled over or into any material, a lip 4 is provided to cause the material to be separated from the mass and material to be separated from the mass and directed into the scoop, the front edges of the bottom and side walls of this lip 4 are in the form of a blade or cutter so as to enable the same to enter the material easily. After the scoop or bucket has been hauled into the material sufficiently to gather a load within and ahead the front end or mouth of the scoop is closed by a hollow lid which in its closing movement gathers an amount of the material ahead and pushes some of the same into the scoop. The lid and the bucket both carry material. This lid preferably comprises two vertically-swinging cheeks or side pieces 5 which are pivotally mounted on the scoop by means of a horizontal transverse rod or shaft 6 passing transversely through corresponding openings or bearings in the upper front parts of the scoop side walls and the rear ends of said side pieces, and a transverse plate or shutter 7 connecting the front ends of the side pieces 5 and provided at its lower edge with a transverse strengthening lip or blade 8. While the scoop is resting on the material and the lid is turned upwardly into its open position, the drag-clam is drawn or hauled forwardly by a drag or pull line 9 bifurcated from point 35 which is connected with the outer lower corners of the lid and extends to a drum forming part of the dredging apparatus with which this drag-clam is associated.

Secured to the lid and projecting rearwardly from the pivot thereof is an operating arm which preferably comprises two rearwardly converging side bars 10, 10, which are secured at their separated inner ends to the side pieces of the lid while their rear ends are connected with each other in any suitable manner. Immediately above the pivot of the lid the side bars of the operating arm are connected by an inner or front cross piece 11 and about midway of the length of these side bars the same are connected by an intermediate cross piece 12. Extending lengthwise between the side bars of the operating arm are two brackets 13, 13 which are spaced apart and connected at their front and rear ends respectively with the inner and intermediate cross pieces, as best shown in Figs. 4, 5, 7, and 8. Arranged between these brackets and pivotally mounted thereon by means of a transverse horizontal axle 14 is an inner or front sheave 15. Extending upwardly from the operating arm between the intermediate cross piece and the rear end of this arm is a clevis which preferably comprises two upwardly-converging links 16, 16 which are pivotally connected at their lower ends by horizontal transverse pins 17 with the side bars of the operating arm while their upper ends are spaced apart but connected with each other by means of a horizontal transverse pin 18. Arranged between the links of the clevis and journaled on this pin are two outer or intermediate sheaves 19, 20, which are preferably, though not necessarily, of the same diameter. This clevis is connected with the fall of the hoisting mechanism which is associated with the drag-clam which fall in the present instance comprises a lower sheave casing 21 connected by chains 22 with the upper ends of the clevis links and a hoisting line 23 connected at one end with the sheave casing 21 and passing from thence upwardly around a sheave 24 on the boom 25 of the derrick, thence downwardly around a sheave 26 in the sheave casing 21, thence upwardly around a sheave 27 on the outer end of the boom, and thence to a suitable drum of the hoisting apparatus. This boom may be raised and lowered and also shifted horizontally by any suitable means. Secured to the rear part of the bottom of the scoop and the rear wall thereof and extending through the central part of the latter, is a hood-shaped bracket 28 in which is arranged a rear sheave 29 which is pivotally mounted on this hood bracket by means of a horizontal transverse pin 30.

31 represents a dump line which is connected at one end with the central part of the intermediate cross piece of the operating arm and passes thence rearwardly and upwardly around the outer sheave 19 of the operating arm, thence forwardly and downwardly around the inner or front sheave 15, thence rearwardly and upwardly through the hood bracket and the rear sheave 29 and thence forwardly and upwardly over the other outer or intermediate sheave 20 of the operating arm to the drag line with which latter it is connected at a point 35, some distance in advance of the drag-clam. This line has sufficient slack that it at no time becomes a loading line. The free or rear end of the operating arm is bifurcated as shown at 32, and when the lid is in its fully opened position this bifurcated portion of the operating arm engages with stops 33 formed on the base of the hood bracket and thereby limits the extent which it is possible to open the lid relatively to the scoop, which position of the parts is represented in Figs. 3 and 4.

Means are provided for automatically locking the lid in its open position after the drag-clam has been shifted into a position in which the load is discharged therefrom. In one construction, these locking means comprise a locking pin 34 projecting laterally from the outer part of one bar of the operating arm, and a locking-latch 36 pivoted at its lower end on the adjacent part of the hood bracket by means of a horizontal transverse pin 37 and provided on its front side with a hook 38 which has its mouth facing forwardly, a convex guard breast 39 arranged immediately below the mouth of the hook and an inclined guide face 40 arranged above the hook. On its rear side the latch is provided with a stop 41 which is adapted to strike the outer side of the bracket 28 to limit the downward movement of the hook 38, and keep incline 40 in proper position that pin 34 may lift hook 38 and this hook may pass beyond pin 34 so that later the hook may take the position shown in Fig. 8.

After the drag-clam has been lowered upon the material to be conveyed and the hoisting fall has been slackened, the drag-clam is pulled forwardly by the drag line during which time the lid is held open by the pull of the drag line and its opening movement is limited by engagement of the rear end of the operating arm with the stops 33, as shown in Fig. 4. During this time the dumping line pulls the slackened hoisting fall which includes the parts 21, 22, 26, and holds them in the position shown in Fig. 4. When sufficient material has been gathered ahead of and into the scoop, the pull on the drag line is discontinued and the drag line is permitted to pay out. Then the initial part of the upward movement of the hoisting fall is effected, thereby causing the operating arm to be elevated and the lid of the scoop to be closed, so as to confine a load within the scoop and the lid. At this time the locking latch is held by gravity in its rearmost inoperative position out of engagement from the locking pin of the operating arm, so as not to interfere with the free upward movement of the latter. During this initial upward movement of the hoisting fall for closing the lid, the dump line pulls out the slackened drag line and makes slack in same between its connection 35 to the dump line and its connection to the drag-clam by reason of the upward movement of the two outer or intermediate sheaves 19, 20 relatively to the front or inner sheave and the rear sheave, all as shown in Fig. 7. The parts of the drag-clam now remain in this position until the same together with the load has been moved vertically and horizontally to the desired position by the hoisting mechanism and when the dumping position has been reached, the drag line is pulled forwardly which also causes a forward pull on the dump line connected therewith. This causes the slack to be again taken out of the drag line, but at the same time, the rear part of the scoop or bucket is shifted from the horizontal position indicated in Fig. 7 to the upright position indicated in Fig. 1, thereby uncovering the mouth of the scoop and causing the same to face downwardly, so that the contents or load in the same is permitted to discharge therefrom. As this is done the upper inclined surface 40 of the latch causes the hook 38 to pass over pin 34. When the scoop and lid reach the limit of their relative opening movement indicated in these figures, the operating arm of the lid engages with the stops on the scoop and the locking pin of the operating arm engages with the guard breast on the latch so as to hold the hook thereof out of engagement. Upon now slackening the pull on the drag line and the dump line connected therewith the scoop is permitted to move downwardly to a small extent until the hook of the latch drops into engagement with the locking pin of the operating arm, as indicated in Fig. 2, after which any further slackening of the drag and dump lines will not change the relative position of the scoop and lid and therefore permit the drag-clam to be lowered as well as shifted horizontally to the place where the next load is to be taken on by the drag-clam always in an opened position.

As the hoisting fall lowers the drag-clam upon the ground or material to be gathered the same changes its position from that shown in Fig. 2 to that shown in Fig. 3 in which the scoop rests with its bottom on the material and the lid is swung upwardly. The pull on the drag line 9 now turns the operating arm downwardly into its lowered position against the stops of the scoop and during this downward movement of the operating arm, the pin 34 engages with the convexed guard breast 39 of the latch and in case gravity were insufficient forces the hook beyond its path so that the operating arm is free to be raised subsequently for closing the lid across the mouth of the scoop. The hoisting fall and the clevis are pulled forwardly relatively to the operating arm to the position shown in Fig. 4 by the dump cable 31.

This cycle of operations is repeated for each load of material which is gathered and transferred to the place intended to receive it. The drag-clam operates efficiently regardless of whether the surface of the material operated upon is level or inclined, it being possible for the drag-clam to adapt itself to any irregularities upon the surface of the material by reason of the flexible connection between the clevis and the hoisting fall.

This drag-clam is not only simple in construction, considering the functions which it performs, but it also permits of considerable economy in time, power and labor.

In the modified construction shown in Figs. 9, 10 and 11, the locking latch 36ª is pivotally mounted on a head 32ª at the rear or outer end of the operating arm 10ª and has a downwardly projecting loop 36ᵇ adapted to engage with a hook 34ª on the rear wall 3ª of the scoop and a forwardly projecting tail 41ª adapted to engage with the lower edge 32ᵇ of the head 32ª below sheave 29ª which forms a stop for the same. In this case, as in the previously described construction, the drag or pull line 9ª connects with the outer lower corners of the lid or shutter but the dump line 31ª connects at its rear end with an eye 31ᵇ on the inner rear corner of the scoop and passes around a sheave 15ª mounted on linkage 22ª which forms part of the hoisting fall and which is attached at its lower end to the free end of the operating arm and carries at its upper end a sheave 26ᵃ around which the hoisting line 23ᵃ passes. 31ᵃ also passes around sheave 29ᵃ in the positions shown in Figs. 2, 7, 8. In this construction, the side arms 10ᵃ rest on the stop 33ᵃ formed by upper edge of the rear wall of the scoop while the hoisting fall is slackened and the scoop is being dragged forwardly by the pull line and 36ᵃ is unlatched as all shown in Fig. 9. Later as the scoop is lifted into its opened position with its rear wall uppermost and the operating arm approaches the rear wall of the scoop, the locking latch loop 36ᵇ being held in proper position by 41ᵃ then against 32ᵇ, will pass beyond hook 34ᵃ and engage with the same when the drag-clam returns to the position shown in Figs. 2 and 8. Thereafter, slackening of the hoisting fall as shown in Figs. 3 and 4 will again permit the locking latch loop to swing by gravity away from the locking hook to permit subsequent closing of the lid by an upward pull of the hoisting fall when sufficient material has been gathered into the scoop during its forward movement by the pull line.

The construction and operation of the drag-clam shown in Figs. 12 and 13 is substantially the same as that shown in Figs. 9 and 11 with the exception that in Figs. 12 and 13 the sheave 15ᶜ which receives the dumping line 31ᵇ and the sheave 26ᵇ which receives the hoisting line 23ᵇ are both mounted in a special integral casing 21ᵇ which is connected by a linkage 22ᵇ with the free end of the operating arm 10ᵃ.

I claim as my invention:

1. A drag clam comprising a scoop having a bottom, side walls, a rear wall and an inlet mouth at its front end, a lid pivoted to swing vertically on said side walls into and out of a position across said mouth, a drag line connected with said lid, an operating arm connected with said lid and projecting rearwardly from the pivot thereof, a rear sheave mounted on the rear part of said scoop, an inner sheave mounted on the inner part of said arm, two outer sheaves mounted on the outer part of said arm, and a dump line connected with said arm and passing from this connection successively around one of said outer sheaves, the inner sheave, the rear sheave and the other outer sheave.

2. A drag clam comprising a scoop having a bottom, side walls, a rear wall and an inlet mouth at its front end, a lid pivoted to swing vertically on said side walls into and out of a position across said mouth, a drag line connected with said lid, an operating arm connected with said lid and projecting rearwardly from the pivot thereof, a rear sheave mounted on the rear part of said scoop, an inner sheave mounted on the inner part of said arm, two outer sheaves mounted on the outer part of said arm, and a dump line connected with said arm and passing from this connection successively around one of said outer sheaves, the inner sheaves, the rear sheave and the other outer sheave, and connected to said drag line.

3. A drag clam comprising a scoop having an inlet mouth at its front end, a lid pivoted on said scoop to swing into and out of a position across said mouth, an operating arm for said lid comprising two rearwardly converging side bars which are connected at their inner ends with said lid while their outer ends are connected together, an inner cross piece connected with the inner parts of said bars, an intermediate cross piece connected with the intermediate parts of said bars, a pair of central longitudinal brackets, a drag line connected with said lid, a hoisting line connected with said arm, an inner sheave mounted on said brackets, two outer sheaves mounted on the outer part of said arm, a rear sheave mounted on the rear part of said scoop, and a dump line connected with said intermediate cross piece and passing successively around one of said outer sheaves, the inner sheave, the rear sheave and the other outer sheave.

4. A drag clam comprising a scoop having an inlet mouth at its front end, a lid pivoted on said scoop to swing into and out of a position across said mouth, an operating arm connected with said lid and projecting rearwardly from the pivot thereof, a clevis pivoted on the outer part of said arm, a drag line connected with said lid, a hoisting line connected with said clevis, an inner sheave mounted on the inner part of said arm, two outer sheaves mounted on said clevis, a rear sheave mounted on the rear part of said scoop, and a dump line connected with said arm and passing successively around one of said outer sheaves, the inner sheave, the rear sheave and the other one of said outer sheaves.

5. A drag clam comprising a scoop having an inlet mouth at its front end, a hood bracket mounted on the rear part of said scoop, a lid pivoted on said scoop to swing into and out of a position across said mouth, an operating arm connected with said lid and projecting rearwardly from the pivot thereof, an inner sheave mounted on the inner part of said arm, two outer sheaves mounted on the outer part of said arm, a rear sheave mounted on said hook bracket, a drag line connected with said lid, a hoisting line connected with said arm, and a dump line connected with said arm and passing successively around one of said outer sheaves, the inner sheave, the rear sheave and the other outer sheave.

6. A clam drag comprising a scoop having an inlet mouth at its front end, a lid pivoted on said scoop to swing into and out of a position across said mouth, an operating arm connected with said lid and projecting rearwardly from the pivot thereof, a latch pivoted on the rear part of said scoop and provided at its free end with a hook which faces forwardly, a breast on the front side of said latch below the mouth of said hook and a guide face on the front side of said latch above the beak of said hook, and a locking pin arranged on said arm and adapted in one position of said parts to engage with the hook of said latch for coupling said arm and scoop and in another position of said parts to engage said breast and hold said latch with its hook out of engagement from said locking pin.

HARRIS T. DUNBAR.